United States Patent
Min et al.

(10) Patent No.: US 12,397,619 B2
(45) Date of Patent: Aug. 26, 2025

(54) VEHICULAR HEAT MANAGEMENT SYSTEM

(71) Applicant: Hanon Systems, Daejeon (KR)

(72) Inventors: Yo Chan Min, Daejeon (KR); Jae Chun You, Daejeon (KR); Yu Ho Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/267,131

(22) PCT Filed: Jul. 14, 2022

(86) PCT No.: PCT/KR2022/010263
§ 371 (c)(1),
(2) Date: Jun. 14, 2023

(87) PCT Pub. No.: WO2023/003269
PCT Pub. Date: Jan. 26, 2023

(65) Prior Publication Data
US 2024/0025237 A1   Jan. 25, 2024

(30) Foreign Application Priority Data

Jul. 23, 2021 (KR) .................. 10-2021-0096790

(51) Int. Cl.
*B60H 1/32* (2006.01)
*B60H 1/00* (2006.01)

(52) U.S. Cl.
CPC ........... *B60H 1/321* (2013.01); *B60H 1/0073* (2019.05); *B60H 1/00785* (2013.01); *B60H 1/00807* (2013.01)

(58) Field of Classification Search
CPC .. B60H 1/321; B60H 1/0073; B60H 1/00785; B60H 1/00807
See application file for complete search history.

(56) References Cited

U.S. PATENT DOCUMENTS 6,250,090 B1 * 6/2001 Mei .................. F25B 47/02
                                                       62/277
2013/0019615 A1 * 1/2013 Choi .................. B60H 1/00914
                                                       62/238.7

(Continued)

FOREIGN PATENT DOCUMENTS

CN        111594983 A  *  8/2020
CN        113432185 A  *  9/2021

(Continued)

OTHER PUBLICATIONS

International Search Report issued in PCT/KR2022/010263 on Oct. 31, 2022.

*Primary Examiner* — Nelson J Nieves
(74) *Attorney, Agent, or Firm* — NORTON ROSE FULBRIGHT US LLP

(57) ABSTRACT

A vehicular heat management system includes a compressor arranged on a heat pump type refrigerant circulation line, a high-pressure side heat exchanger arranged on the heat pump type refrigerant circulation line, an outdoor heat exchanger arranged on the heat pump type refrigerant circulation line, a plurality of expansion valves arranged on the heat pump type refrigerant circulation line, a low-pressure side heat exchanger arranged on the heat pump type refrigerant circulation line, a first expansion valve arranged on the upstream side of the outdoor heat exchanger, a second expansion valve arranged on the downstream side of the outdoor heat exchanger, and a control part configured to control opening degrees of the first expansion valve and the second expansion valve depending on whether icing occurs in the outdoor heat exchanger under a heat pump mode condition.

9 Claims, 7 Drawing Sheets

(56) References Cited

U.S. PATENT DOCUMENTS

| | | | |
|---|---|---|---|
| 2014/0041404 A1* | 2/2014 | Tsunoda | B60H 1/321 62/156 |
| 2016/0016459 A1* | 1/2016 | Hamamoto | B60H 1/00007 62/160 |
| 2016/0153697 A1* | 6/2016 | Hamamoto | F25B 41/39 62/160 |
| 2017/0361677 A1* | 12/2017 | Kim | H01M 10/663 |
| 2018/0065451 A1* | 3/2018 | Choi | F25B 41/20 |
| 2018/0117985 A1* | 5/2018 | Kim | B60H 3/024 |
| 2018/0117986 A1* | 5/2018 | Kim | B60H 1/00278 |
| 2019/0030992 A1* | 1/2019 | Tada | B60H 1/22 |
| 2019/0184790 A1* | 6/2019 | Miura | B60H 1/00278 |
| 2019/0202258 A1 | 7/2019 | Peng et al. | |
| 2019/0316822 A1* | 10/2019 | Tada | B60H 1/00921 |
| 2019/0351739 A1* | 11/2019 | Kim | B60H 1/32281 |
| 2021/0348817 A1* | 11/2021 | Bates | F25B 47/006 |
| 2022/0057122 A1* | 2/2022 | Kasai | F25B 41/26 |
| 2022/0260292 A1* | 8/2022 | Kawashima | F25D 21/12 |

FOREIGN PATENT DOCUMENTS

| | | | | |
|---|---|---|---|---|
| CN | 114435063 A | * | 5/2022 | B60H 1/00278 |
| JP | 2015063169 A | | 4/2015 | |
| KR | 20120140085 A | | 12/2012 | |
| KR | 20130101260 A | | 9/2013 | |
| KR | 101811762 B1 | | 12/2017 | |
| KR | 20190057769 A | | 5/2019 | |

* cited by examiner

→ : Air conditioner mode
---→ : Heat pump mode

PRIOR ART

VEHICULAR HEAT MANAGEMENT SYSTEM

CROSS REFERENCE TO RELATED APPLICATIONS

This patent application is a national phase under 35 U.S.C. § 371 of International Patent Application No. PCT/KR2022/010263 filed Jul. 14, 2022, which claims the benefit of priority from Korean Patent Application No. 10-2021-0096790 filed Jul. 23, 2021, each of which is hereby incorporated herein by reference in its entirety for all purposes.

TECHNICAL FIELD

The present invention relates to a vehicular heat management system and, more particularly, to a vehicular heat management system capable of coping with the occurrence of icing in an outdoor heat exchanger without restricting the flow of a refrigerant to the outdoor heat exchanger when the icing occurs in the outdoor heat exchanger under a heat pump mode condition and capable of preventing the instability of a refrigerant flow in a refrigerant circulation line due to the restriction of a refrigerant flow to the outdoor heat exchanger and the resultant deterioration of heating performance in the vehicle interior.

BACKGROUND ART

Examples of an eco-friendly vehicle include an electric vehicle, a hybrid vehicle, and a fuel cell vehicle (hereinafter collectively referred to as "vehicle").

Such a vehicle is equipped with various heat management devices. For example, as shown in FIG. 1, the heat management devices include an air conditioner 10 for cooling and heating a vehicle interior, and a water-cooled cooling device 20 for cooling a battery B, and an electric component module P.

The air conditioner 10 is of a heat pump type and is provided with a refrigerant circulation line 12.

The refrigerant circulation line 12 includes a compressor 12a, a high-pressure side indoor heat exchanger 12b, a first expansion valve 12c, an outdoor heat exchanger 12d, a second expansion valve 12e, a third expansion valve 12f parallel to the second expansion valve 12e, a chiller 12g arranged on the second expansion valve 12e, and a low-pressure side indoor heat exchanger 12h arranged on the downstream side of the third expansion valve 12f.

In the refrigerant circulation line 12, the first expansion valve 12c is opened in an air conditioner mode, so that the refrigerant in the compressor 12a can circulate in the order of the high-pressure side indoor heat exchanger 12b, the outdoor heat exchanger 12d, the second expansion valve 12e, the third expansion valve 12f, the chiller 12g, and the low-pressure side indoor heat exchanger 12h.

Through this refrigerant circulation, a low-temperature cold air is generated in the chiller 12g and the low-pressure side indoor heat exchanger 12h. The generated cold air is delivered to the vehicle interior, the battery B, and the electric component module P, thereby cooling the vehicle interior, the battery B, and the electric component module P.

Further, in a heat pump mode, the first expansion valve 12c is turned on, so that the refrigerant in the compressor 12a circulates in the order of the high-pressure side indoor heat exchanger 12b, the first expansion valve 12c, and the outdoor heat exchanger 12d.

In addition, high-temperature heat is generated in the high-pressure side indoor heat exchanger 12b through the circulation of the refrigerant. The generated heat is supplied to the vehicle interior to heat the vehicle interior.

The refrigerant circulation line 12 further includes an electric component waste heat chiller 12i. The electric component waste heat chiller 12i is configured to allow the refrigerant in the refrigerant circulation line 12 returning from the outdoor heat exchanger 12d to the compressor 12a to exchange heat with the cooling water in a cooling water circulation line 22 of a water-cooled cooling device 20 that absorbs the waste heat from the battery B and the electric component module P.

Therefore, the waste heat of the battery B and the electric component module P can be recovered to the refrigerant of the refrigerant circulation line 12. The heat pump mode efficiency of the air conditioner 10 can be increased through this waste heat recovery.

Meanwhile, when the temperature of the outdoor heat exchanger 12d is lowered to a low temperature under a specific external air condition, for example, a high humidity condition, while the air conditioner 10 enters the heat pump mode, there is a concern that icing may occur on the surface of the outdoor heat exchanger 12d.

Thus, the air conditioner 10 further includes an icing prevention part 14 for preventing the occurrence of icing in the outdoor heat exchanger 12d.

The icing prevention part 14 includes a three-way flow control valve 14a that bypasses the refrigerant before being introduced into the outdoor heat exchanger 12d to the electric component waste heat chiller 12i.

When icing occurs in the outdoor heat exchanger 12d, the icing prevention part 14 restricts the flow of the refrigerant to the outdoor heat exchanger 12d by bypassing the refrigerant before being introduced into the outdoor heat exchanger 12d, thereby preventing the icing of the outdoor heat exchanger 12d.

However, such a conventional heat management system needs to change the flow of the refrigerant in the refrigerant circulation line 12 through the three-way flow control valve 14a when icing occurs in the outdoor heat exchanger 12d while entering the heat pump mode. Therefore, the flow of the refrigerant becomes unstable, and the efficiency of the heat pump mode is lowered.

In particular, the refrigerant flow in the refrigerant circulation line 12 is frequently changed while the three-way flow control valve 14a is repeatedly operated to prevent icing of the outdoor heat exchanger 12d. Due to this frequent change in the refrigerant flow, the refrigerant flow in the circulation line 12 becomes unstable. The heat exchange rate in the high-pressure side indoor heat exchanger 12b fluctuates and the temperature change of the air discharged into the vehicle interior intensifies. As a result, the heating performance in the vehicle interior is lowered.

In addition, the conventional heat management system has a structure that restricts the flow of the refrigerant to the outdoor heat exchanger 12d when icing occurs in the outdoor heat exchanger 12d. Therefore, the heat exchange efficiency (evaporation efficiency) of the refrigerant is relatively lowered. Thus, the amount of heat generated in the high-pressure side indoor heat exchanger 12b is also relatively reduced, resulting in poor heating performance in the vehicle interior.

SUMMARY

In view of the problems inherent in the related art, it is an object of the present invention to provide a vehicular heat management system capable of coping with the occurrence of icing in an outdoor heat exchanger without restricting the flow of a refrigerant to the outdoor heat exchanger when the icing occurs in the outdoor heat exchanger.

Another object of the present invention is to provide a vehicular heat management system capable of preventing the instability of a refrigerant flow in a refrigerant circulation line due to the restriction of a refrigerant flow to the outdoor heat exchanger when icing occurs in the outdoor heat exchanger.

A further object of the present invention is to provide a vehicular heat management system capable of preventing a change in a heat exchange rate in a high-pressure side indoor heat exchanger due to unstable refrigerant flow in a refrigerant circulation line and a change in a temperature of an air discharged into the vehicle interior, thereby improving the heating performance in the vehicle interior.

A still further object of the present invention is to provide a vehicular heat management system capable of preventing the reduction of refrigerant heat exchange efficiency (evaporation efficiency) on the outdoor heat exchanger side due to the restriction of the refrigerant flow to the outdoor heat exchanger.

A yet still further object of the present invention is to provide a vehicular heat management system capable of preventing a decrease in a heat generation amount in a high-pressure side indoor heat exchanger, thereby improving the heating performance in the vehicle interior.

In order to achieve these objects, there is provided a vehicular heat management system, including: a compressor arranged on a heat pump type refrigerant circulation line; a high-pressure side heat exchanger arranged on the heat pump type refrigerant circulation line; an outdoor heat exchanger arranged on the heat pump type refrigerant circulation line; a plurality of expansion valves arranged on the heat pump type refrigerant circulation line; a low-pressure side heat exchanger arranged on the heat pump type refrigerant circulation line; a first expansion valve arranged on the upstream side of the outdoor heat exchanger; a second expansion valve arranged on the downstream side of the outdoor heat exchanger; and a control part configured to control opening degrees of the first expansion valve and the second expansion valve depending on whether icing occurs in the outdoor heat exchanger under a heat pump mode condition.

In the system, the control part may be configured to enter a dual expansion mode in which a refrigerant is expanded by the first expansion valve and the second expansion valve if the control part determines that icing occurs in the outdoor heat exchanger, and enter a single expansion mode in which a refrigerant is expanded by only one of the first expansion valve and the second expansion valve if the control part determines that icing does not occur in the outdoor heat exchanger.

In the system, the control part may be configured to, in the single expansion mode, fully open the second expansion valve on the downstream side of the outdoor heat exchanger and control the opening degree of the first expansion valve on the upstream side of the outdoor heat exchanger to adjust a refrigerant flow rate on the side of the outdoor heat exchanger.

In the system, the control part may be configured to, in the dual expansion mode, control the opening degrees of the first expansion valve and the second expansion valve to adjust the refrigerant flow rate on the side of the outdoor heat exchanger.

In the system, the control part may be configured to, in the dual expansion mode, control the opening degrees of the first expansion valve and the second expansion valve to adjust the refrigerant flow rate on the side of the outdoor heat exchanger in a decreasing direction so that the temperature of the outdoor heat exchanger is increased to cope with occurrence of icing.

In the system, the control part may be configured to, in the dual expansion mode, keep the opening degree of one of the first expansion valve and the second expansion valve constant, and variably control the opening degree of the other of the first expansion valve and the second expansion valve.

In the system, the control part may be configured to, in the dual expansion mode, keep the opening degree of the first expansion valve constant, and variably control the opening degree of the second expansion valve.

In the system, the control part may be configured to, in the dual expansion mode, periodically predict the probability of occurrence of icing in the outdoor heat exchanger according to a pre-stored logic, and variably control the opening degree of the second expansion valve according to the predicted probability of occurrence of icing.

In the system, the control part may be configured to, in the dual expansion mode, periodically calculate an icing occurrence index of the outdoor heat exchanger at predetermined time intervals through pre-stored Formula 2: icing occurrence index (I)=outdoor air temperature (Tamb)−outdoor heat exchanger outlet refrigerant temperature (Tref), the control part may be configured to predict that the probability of occurrence of icing in the outdoor heat exchanger is high if the calculated icing occurrence index is greater than a pre-stored reference index, and the control part may be configured to predict that the probability of occurrence of icing in the outdoor heat exchanger is low if the calculated icing occurrence index is smaller than the reference index.

According to the vehicular heat management system of the present invention, when icing occurs in the outdoor heat exchanger under a heat pump mode condition, the temperature of the outdoor heat exchanger is adjusted by controlling the opening degree of the third expansion valve on the downstream side of the outdoor heat exchanger. Therefore, when icing occurs in the outdoor heat exchanger, it is possible to cope with the occurrence of icing in the outdoor heat exchanger without restricting the flow of the refrigerant to the outdoor heat exchanger.

In addition, since it is possible to cope with the occurrence of icing in the outdoor heat exchanger without restricting the flow of the refrigerant to the outdoor heat exchanger, the unstable flow of the refrigerant in the refrigerant circulation line due to the restriction of the flow of the refrigerant to the outdoor heat exchanger can be prevented when icing occurs in the outdoor heat exchanger.

In addition, since the instability of the flow of the refrigerant in the refrigerant circulation line due to the restriction of the flow of the refrigerant to the outdoor heat exchanger can be prevented, it is possible to prevent the fluctuation of the heat exchange rate in the high-pressure side indoor heat exchanger due to the instability of the flow of the refrigerant in the refrigerant circulation line and the resultant change in the temperature of the air discharged into the vehicle interior, thereby improving the heating performance in the vehicle interior.

In addition, since it is possible to cope with the occurrence of icing in the outdoor heat exchanger without restricting the flow of the refrigerant to the outdoor heat exchanger when icing occurs in the outdoor heat exchanger, the decrease in the refrigerant heat exchange efficiency (evaporation efficiency) on the outdoor heat exchanger side due to the restriction of the refrigerant flow to the outdoor heat exchanger can be prevented.

In addition, since it is possible to prevent the decrease in the refrigerant heat exchange efficiency (evaporation efficiency) on the outdoor heat exchanger side due to the restriction of the refrigerant flow to the outdoor heat exchanger, it is possible to prevent a decrease in the heat generation amount in the high-pressure side indoor heat exchanger, thereby improving the heating performance in the vehicle interior.

DETAILED DESCRIPTION

Figure 1:
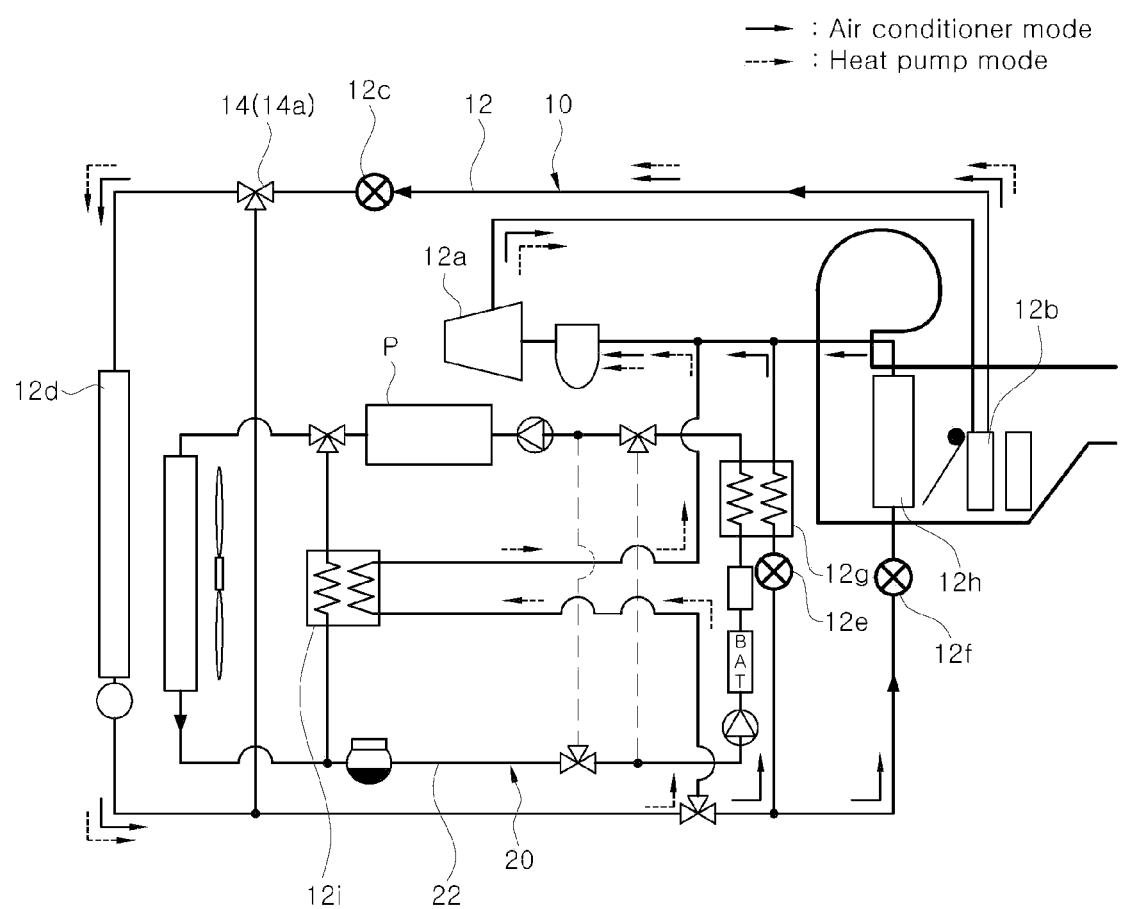
FIG. 1 is a diagram showing a conventional vehicular heat management system.

Preferred embodiments of a vehicular heat management system according to the present invention will now be described in detail with reference to the accompanying drawings.

First Embodiment

Prior to describing the features of the vehicular heat management system according to the present invention, the general configurations of the vehicular heat management system will be briefly described with reference to FIG. 2.

The vehicular heat management system includes an air conditioner 100 that cools and heats the vehicle interior, and a water-cooled cooling device 200 that cools the battery B and the electric component module P.

The air conditioner 100 is of a heat pump type and includes a refrigerant circulation line 110.

The refrigerant circulation line 110 includes a compressor 112, a high-pressure side indoor heat exchanger 114, a first expansion valve 116, an outdoor heat exchanger 118, a second expansion valve 120, a third expansion valve 122 parallel to the second expansion valve 120, a chiller 124 arranged on the downstream side of the second expansion valve 120, and a low-pressure side indoor heat exchanger 126 on the downstream side of the third expansion valve 122.

The first expansion valve 116 and the second expansion valve 120 are of an electromagnetic type (EXV), and the third expansion valve 122 is of a thermostatic type (TXV) having an ON and OFF function.

In the refrigerant circulation line 110, the first expansion valve 116 is opened in an air conditioner mode, so that the refrigerant in the compressor 112 can circulate in an order of the high-pressure side indoor heat exchanger 114, the outdoor heat exchanger 118, the second expansion valve 120, the third expansion valve 122, the chiller 124, and the low-pressure side indoor heat exchanger 126.

Through this refrigerant circulation, a low-temperature cold air is generated in the chiller 124 and the low-pressure indoor heat exchanger 126. The generated cold air is delivered to the vehicle interior, the battery B, and the electric component module P. Therefore, the vehicle interior, the battery B, and the electric component module P are cooled.

In addition, in a heat pump mode, the first expansion valve 116 is turned on, so that the refrigerant in the compressor 112 circulates in an order of the high-pressure side indoor heat exchanger 114, the first expansion valve 116, and the outdoor heat exchanger 118.

In addition, high-temperature heat is generated in the high-pressure side indoor heat exchanger 114 through the circulation of the refrigerant. The generated heat is supplied to the vehicle interior to heat the vehicle interior.

Meanwhile, in the heat pump mode, the chiller 124 serves also to allow the refrigerant in the refrigerant circulation line 110 returning from the outdoor heat exchanger 118 to the compressor 112 to exchange heat with the cooling water on the side of a cooling water circulation line 210 of a water-cooled cooling device 200 that has absorbed the waste heat of the battery B and the electric component module P.

Therefore, in the heat pump mode, the waste heat from the battery B and the electric component module P can be recovered to the refrigerant in the refrigerant circulation line 110.

Further, the second expansion valve 120 on the upstream side of the chiller 124 is configured to variably adjust the depressurization/expansion amount of the refrigerant introduced into the chiller 124 even in the heat pump mode.

Therefore, in the heat pump mode, it is possible to variably adjust the amount of heat absorbed by the chiller 124 and the outdoor heat exchanger 118 on the upstream side.

In particular, the temperature of the outdoor heat exchanger 118 can be adjusted by allowing the heat absorption amount of the upstream-side outdoor heat exchanger 118 to be variably adjusted.

Next, features of the vehicular heat management system according to the present invention will be described in detail with reference to FIGS. 2 to 5.

Figure 2:
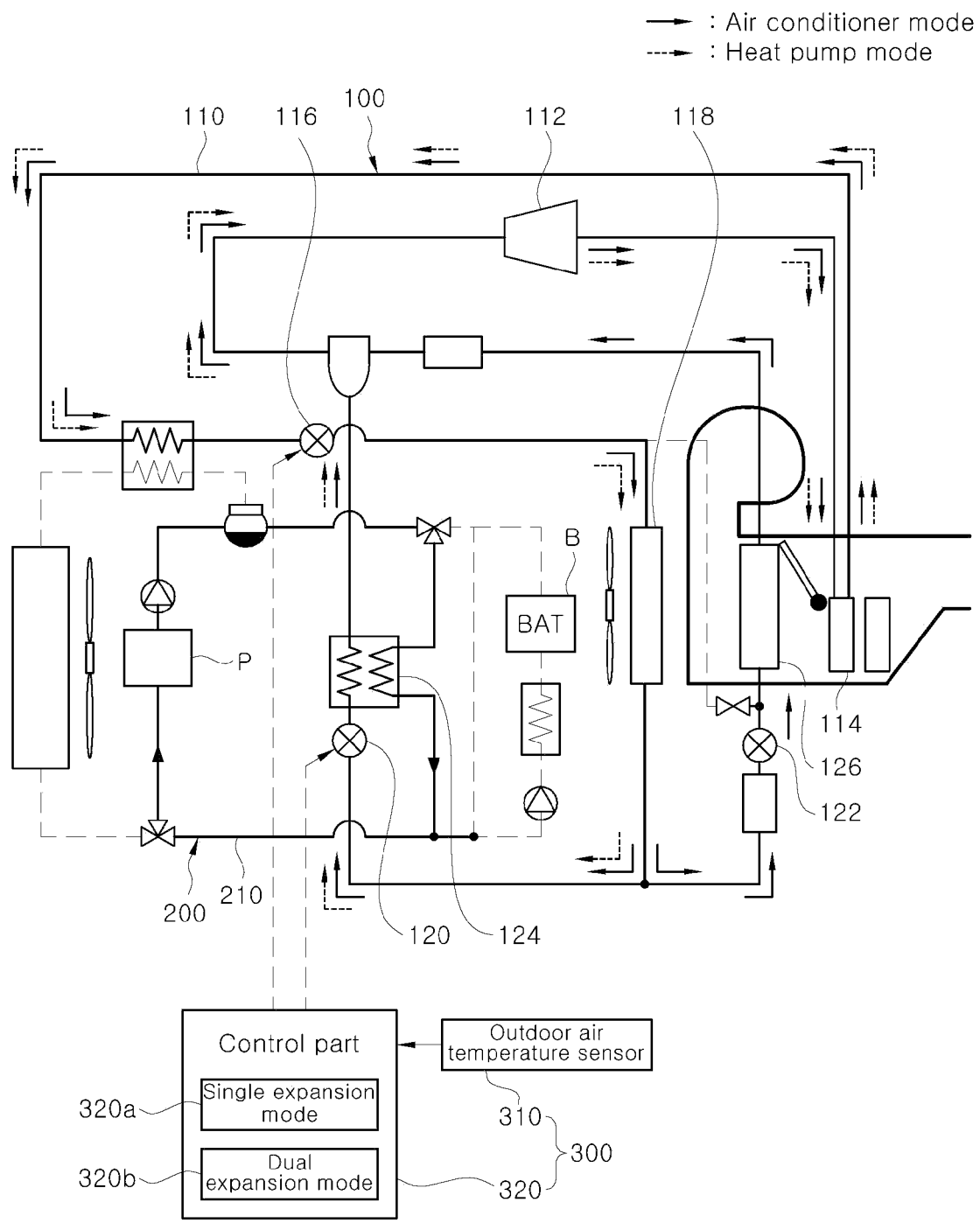
FIG. 2 is a view showing a vehicular heat management system according to a first embodiment of the present invention.

Referring first to FIG. 2, the vehicular heat management system according to the present invention includes an icing occurrence determination part 300 that determines whether icing occurs in the outdoor heat exchanger 118 when entering the heat pump mode.

The icing occurrence determination part 300 includes an outdoor air temperature sensor 310 that detects the temperature outside the vehicle interior, and a control part 320 that determines whether icing occurs in the outdoor heat exchanger 118 based on the outdoor air temperature data inputted from the outside temperature sensor 310.

The outdoor air temperature sensor 310 is installed on the outside of the vehicle interior, and is configured to detect the outdoor air temperature and input the detected outdoor air temperature data to the control part 320.

The control part 320 is provided with a microprocessor. When the outdoor air temperature data is inputted from the outdoor air temperature sensor 310 under the heat pump mode, the control part 320 determines whether the inputted outdoor air temperature falls within a temperature range in which icing occurs in the outdoor heat exchanger 118, thereby determining whether icing occurs in the outdoor heat exchanger 118.

That is, as shown in Formula 1 below, it is determined whether the outdoor air temperature falls within a range exceeding a first set temperature and less than a second set temperature higher than the first set temperature.

First set temperature<Outdoor air temperature<Second set temperature   Formula 1

As a result of the determination, if the outdoor air temperature does not fall within the range exceeding the first set temperature and less than the second set temperature, the control part 320 determines that no icing has occurred in the outdoor heat exchanger 118.

As a result of the determination, if the outdoor air temperature falls within the range exceeding the first set temperature and less than the second set temperature, the control part 320 determines that icing has occurred in the outdoor heat exchanger 118.

In this regard, it is preferable that the first set temperature, which is a criterion for determining whether icing occurs in the outdoor heat exchanger 118, is set to −5 degrees C., and the second set temperature is set to 5 degrees C.

This is because it was found that icing occurs in the outdoor heat exchanger 118 when the outdoor air temperature is in the range between −5 degrees C. and 5 degrees C. under the heat pump mode condition.

Referring again to FIG. 2, after determining whether icing has occurred in the outdoor heat exchanger 118, the control part 320 controls the first expansion valve 116 and the second expansion valve 120 on the upstream and downstream sides of the outdoor heat exchanger 118 according to the determination result to prevent the occurrence of icing in the outdoor heat exchanger 118.

Explaining this in more detail, if it is determined that no icing has occurred in the outdoor heat exchanger 118, the control part 320 enters the single expansion mode 320a. The control part 320 is configured to control only one of the first expansion valve 116 and the second expansion valve 120 in the single expansion mode 320a.

In particular, the second expansion valve 120 is fully opened, and only the opening degree is controlled for the first expansion valve 116 to adjust the depressurization/expansion amount of the refrigerant introduced into the outdoor heat exchanger 118.

Figure 3:
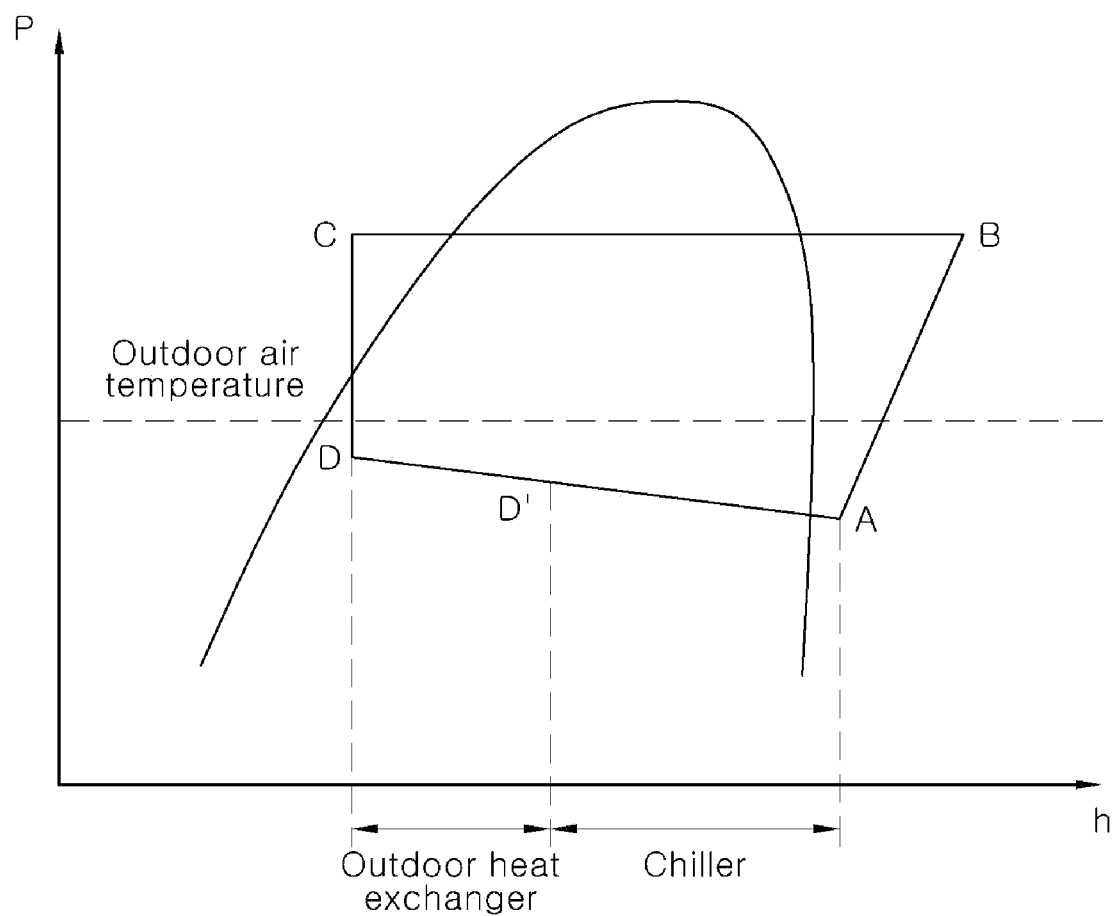
FIG. 3 is a p-h diagram for explaining an operation example of the vehicular heat management system according to the first embodiment of the present invention, showing the control of the vehicular heat management system when no icing occurs in an outdoor heat exchanger in a heat pump mode.

Therefore, as shown in the p-h diagram of FIG. 3, it is possible to maintain a high refrigerant evaporation rate (D-D') in the outdoor heat exchanger 118. Through this high refrigerant evaporation rate, the outdoor heat exchanger 118 makes it possible to control the heat generation amount of the high-pressure side indoor heat exchanger 114 while maintaining the temperature lower than the outdoor air temperature.

When it is determined that icing has occurred in the outdoor heat exchanger 118, the control part 320 enters a dual expansion mode 320b as shown in FIG. 2. In the dual expansion mode 320b, the control part 320 is configured to control both the first expansion valve 116 and the second expansion valve 120.

Figure 4:
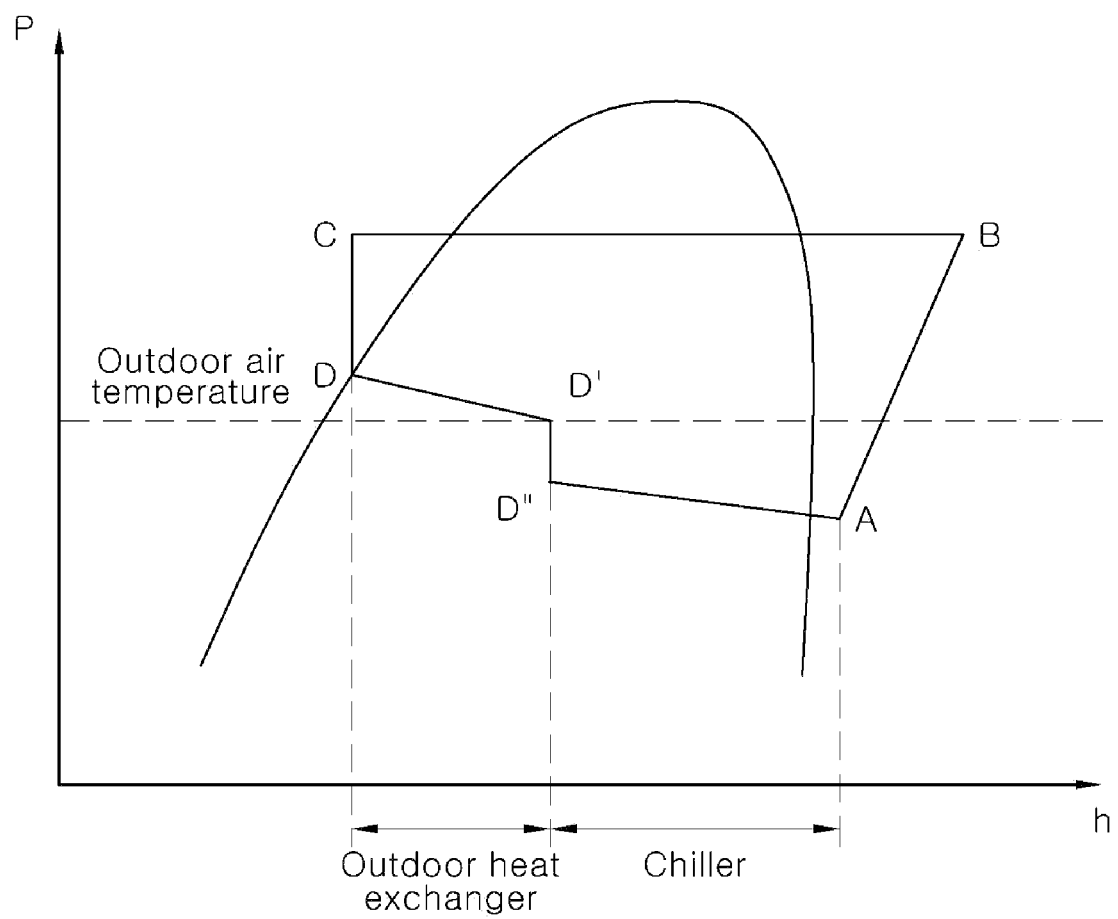
FIG. 4 is a p-h diagram for explaining an operation example of the vehicular heat management system according to the first embodiment of the present invention, showing the control of the vehicular heat management system when icing occurs in the outdoor heat exchanger in the heat pump mode.

In particular, by variably controlling the opening degree of the second expansion valve 120, the refrigerant on the downstream side of the outdoor heat exchanger 118 is once again decompressed and expanded (D'-D") as shown in the p-h diagram of FIG. 4. The flow rate of the refrigerant on the side of the outdoor heat exchanger 118 is reduced during the process of depressurization and expansion of the refrigerant on the downstream side.

Accordingly, the refrigerant evaporation (D-D') rate in the outdoor heat exchanger 118 is lowered, and the outdoor heat exchanger 118 can maintain a temperature higher than the outdoor temperature due to this low refrigerant evaporation rate.

Thus, it is possible to cope with the occurrence of icing in the outdoor heat exchanger 118. In particular, since the outdoor heat exchanger 118 is maintained at a higher temperature than the outdoor air temperature, the occurrence of icing in the outdoor heat exchanger 118 is fundamentally prevented. Even when icing occurs in the outdoor heat exchanger 118, the icing can be removed quickly.

Referring again to FIG. 2, the control part 320 controls the opening degree of the second expansion valve 120 in the state of entering the dual expansion mode 320b to prevent the occurrence of icing in the outdoor heat exchanger 118. Thereafter, the control part 320 periodically predicts the probability of occurrence of icing in the outdoor heat exchanger 118 according to a preset logic, and periodically variably controls the opening degree of at least one of the first and second expansion valves 116 and 120 according to the predicted probability of occurrence of icing in the outdoor heat exchanger 118.

That is, in the dual expansion mode 320b, the control part 320 periodically calculates an icing occurrence index I in the outdoor heat exchanger 118 at predetermined time intervals through formula 2 below. For example, the icing occurrence index I is calculated at intervals of 30 seconds.

Icing occurrence index($I$)=Outdoor air temperature ($T$amb)−Outdoor heat exchanger outlet refrigerant temperature($T$ref)   Formula 2

When the calculation of the icing occurrence index I is completed, the control part 320 compares the calculated icing occurrence index I with a pre-stored reference index Tset to predict the probability of occurrence of icing in the outdoor heat exchanger 118, and variably control the opening degree of the second expansion valve 120 according to the predicted probability of occurrence of icing.

In particular, the control part 320 compares the icing occurrence index I with the reference index Tset, predicts he probability of occurrence of icing in the outdoor heat exchanger 118 according to the comparison result, and increases or decreases the opening degree of the second expansion valve 120 by a preset value according to the predicted probability of occurrence of icing.

That is, for example, if it is confirmed that the calculated icing occurrence index I is greater than the reference index Tset, the control part 320 determines that the outdoor heat exchanger 118 has a high probability of occurrence of icing in the outdoor heat exchanger 118. According to this determination, the control part 320 reduces the opening degree of the second expansion valve 120 by a predetermined value.

Therefore, the flow rate of the refrigerant in the outdoor heat exchanger 118 is reduced by a predetermined amount, thereby reducing the evaporation rate of the refrigerant in the outdoor heat exchanger 118 so that the temperature of the outdoor heat exchanger 118 can be maintained at a higher level.

As a result, it is possible to fundamentally prevent the occurrence of icing in the outdoor heat exchanger 118 by actively coping with the high probability of occurrence of icing in the outdoor heat exchanger 118.

Conversely, if it is confirmed that the calculated icing occurrence index I is smaller than the reference index Tset, the control part 320 determines that the probability of occurrence of icing in the outdoor heat exchanger 118 is low. According to this determination, the control part 320 increases the opening degree of the second expansion valve 120 by a predetermined value.

Therefore, the flow rate of the refrigerant in the outdoor heat exchanger 118 is increased by a predetermined amount, thereby increasing the evaporation rate of the refrigerant in the outdoor heat exchanger 118 so that the temperature of the outdoor heat exchanger 118 can be maintained at a lower level.

As a result, it is possible to actively cope with the low probability of occurrence of icing in the outdoor heat exchanger 118.

Meanwhile, the control part 320 controls the opening degree of the second expansion valve 120 to be maintained at the current state when the calculated icing occurrence index I is equal to the reference index Tset.

Referring again to FIG. 2, in the dual expansion mode 320b, the control part 320 fixes the opening degree of the first expansion valve 116 when variably controlling the opening degree of the second expansion valve 120.

In particular, when the opening degree of the second expansion valve 120 is variably controlled according to the icing occurrence probability in the outdoor heat exchanger 118, the control part 320 controls the opening degree of the first expansion valve 116 at an opening degree available before the entry into the dual expansion mode 320b or a preset opening degree.

Therefore, in the dual expansion mode 320b, the opening degree of the first expansion valve 116 is fixed, the depressurization/expansion amount of the refrigerant introduced into the outdoor heat exchanger 118 is kept constant, and the heat absorption temperature of the outdoor heat exchanger 118 is controlled while controlling the refrigerant flow rate on the outdoor heat exchanger 118 side only by adjusting the opening degree of the second expansion valve 120.

Meanwhile, in the dual expansion mode 320b, depending on the circumstances, the opening degree of the second expansion valve 120 may be fixed at a constant value, and the opening degree of the first expansion valve 116 may be variably controlled.

In particular, the opening degree of the second expansion valve 120 may be fixed at a preset value, and the opening degree of the first expansion valve 116 may be variably controlled according to the probability of occurrence of icing in the outdoor heat exchanger 118.

Therefore, it is possible to control the refrigerant flow rate in the outdoor heat exchanger 118 and adjust the heat absorption temperature in the outdoor heat exchanger 118 only by adjusting the opening degree of the first expansion valve 116.

Referring again to FIG. 2, in the dual expansion mode 320b, if the outdoor air temperature inputted by the outdoor temperature sensor 310 does not fall within the icing occurrence temperature range of the outdoor heat exchanger 118, i.e., if the outdoor air temperature is a first set temperature (−5 degrees C.) or lower, or a second set temperature (5 degrees C.) or higher, the control part 320 determines that there is no possibility of occurrence of icing in the outdoor heat exchanger 118.

According to this determination, the control part 320 enters the single expansion mode 320a while being released from the dual expansion mode 320b. The control part 320 that has entered the single expansion mode 320a fully opens the second expansion valve 120 and controls only the first expansion valve 116 to adjust the depressurization/expansion amount of the refrigerant introduced into the outdoor heat exchanger 118.

Meanwhile, in the single expansion mode 320a, the control part 320 periodically predicts the probability of occurrence of icing in the outdoor heat exchanger 118 according to a preset logic.

In particular, as described above, the control part 320 periodically calculates the icing occurrence index I of the outdoor heat exchanger 118 at predetermined time intervals through Formula 2, and compares the calculated icing occurrence index I with a pre-stored reference index Tset to predict the probability of occurrence of icing in the outdoor heat exchanger 118.

As a result of predicting the probability of occurrence of icing in the outdoor heat exchanger 118, if it is determined that the probability of occurrence of icing in the outdoor heat exchanger 118 is high, the control part 320 controls the first and second expansion valves 116 and 120 while switching from the single expansion mode 320a to the dual expansion mode 320b.

In particular, the control part 320 controls the first and second expansion valves 116 and 120 to induce expansion of the refrigerant twice in the outdoor heat exchanger 118. By inducing the expansion of the refrigerant twice, the control part 320 adjusts the flow rate of the refrigerant in the outdoor heat exchanger 118. By adjusting the flow rate of the refrigerant in the outdoor heat exchanger 118, the control part 320 controls the temperature of the outdoor heat exchanger 118 and fundamentally prevents occurrence of a surface icing phenomenon.

Next, an operation example of the vehicular heat management system according to the present invention having such a configuration will be described in detail with reference to FIGS. 2 and 5.

Figure 5:
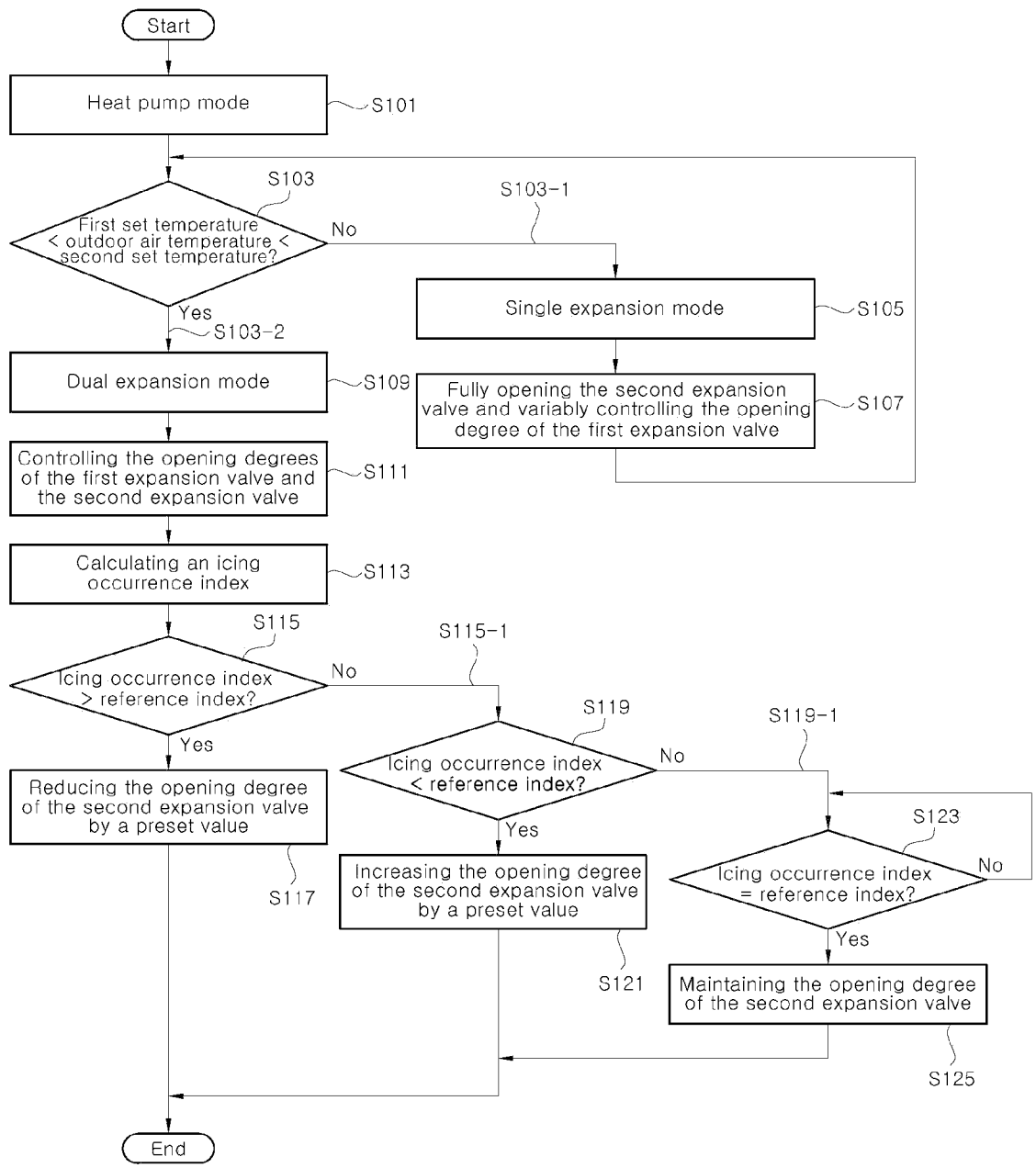
FIG. 5 is a flowchart showing an operation example of the vehicular heat management system according to the first embodiment of the present invention and showing an operation example depending on whether icing occurs in an outdoor heat exchanger under a heat pump mode condition.

Referring first to FIG. 5, in the heat pump mode state (S101), it is determined whether the outdoor air temperature falls within a range exceeding a first set temperature (−5 degrees C.) and less than a second set temperature (5 degrees C.) (S103).

As a result of the determination, if the outdoor air temperature does not fall within the range exceeding the first set temperature (−5 degrees C.) and less than the second set temperature (5 degrees C.) (S103-1), the control part 320 determines that no icing has occurred in the outdoor heat exchanger 118. According to this determination, the control part 320 enters a single expansion mode 320a (S105).

As shown in FIGS. 2 and 5, the control part 320 that has entered the single expansion mode 320a fully opens the second expansion valve 120 and controls only the first expansion valve 116 to variably adjust the depressurization/expansion amount of the refrigerant introduced into the outdoor heat exchanger 118 (S107).

Meanwhile, as a result of the determination in step S103, if the outdoor air temperature falls within the range exceeding the first set temperature (−5 degrees C.) and less than the second set temperature (5 degrees C.) (S103-2), the control part 320 determines that icing has occurred in the outdoor heat exchanger 118. According to this determination, the control part 320 enters a dual expansion mode 320b (S109).

The control part 320 that has entered the dual expansion mode 320b controls the opening degrees of the first expansion valve 116 and the second expansion valve 120 (S111).

In particular, by variably controlling the opening degree of the second expansion valve 120, the control part 320 depressurizes and expands the refrigerant on the downstream side of the outdoor heat exchanger 118 once again, thereby reducing the refrigerant flow rate in the outdoor heat exchanger 118 and lowering the refrigerant evaporation rate in the outdoor heat exchanger 118.

Then, the temperature of the outdoor heat exchanger 118 is increased so as to prevent occurrence of icing on the surface and remove the generated icing.

Meanwhile, in the dual expansion mode 320b, the control part 320 periodically calculates the icing occurrence index I of the outdoor heat exchanger 118 through Formula 2 at predetermined time intervals (S113).

When the calculation of the icing occurrence index I is completed, the control part 320 periodically determines whether the calculated icing occurrence index I is greater than a pre-stored reference index Tset (S115).

As a result of the determination, if the icing occurrence index I is greater than the reference index Tset, the control part 320 determines that the probability of occurrence of icing in the outdoor heat exchanger 118 is high, thereby reducing the opening degree of the second expansion valve 120 by a preset value (S117).

Then, the flow rate of the refrigerant in the outdoor heat exchanger 118 decreases, and the evaporation rate of the refrigerant in the outdoor heat exchanger 118 decreases. The temperature of the outdoor heat exchanger 118 increases due to the reduced evaporation rate. This makes it possible to cope with the probability of occurrence of icing inf the outdoor heat exchanger (118).

Meanwhile, as a result of the determination in step S115, if the icing occurrence index I is not greater than the reference index Tset (S115-1), the control part 320 determines again whether the icing occurrence index I is smaller than the reference index Tset (S119).

As a result of the determination, if the icing generation index I is smaller than the reference index Tset, the control part 320 determines that the probability of occurrence of icing in the outdoor heat exchanger 118 is low, thereby increasing the opening degree of the second expansion valve 120 by a preset value (S121).

Then, the flow rate of the refrigerant in the outdoor heat exchanger 118 increases, and the evaporation rate of the refrigerant in the outdoor heat exchanger 118 increases. The temperature of the outdoor heat exchanger 118 is decreased due to the increased evaporation rate. This makes it possible to cope with the probability of occurrence of icing in the outdoor heat exchanger 118.

Meanwhile, as a result of the determination in step S119, if the icing occurrence index I is not smaller than the reference index Tset (S119-1), the control part 320 determines again whether the icing occurrence index I is equal to the reference index Tset (S123).

As a result of the determination, if the icing occurrence index I is equal to the reference index Tset, the control part 320 keeps the opening degree of the second expansion valve 120 at the current state (S125).

According to the vehicular heat management system of the present invention, when icing occurs in the outdoor heat exchanger 118 under the heat pump mode condition, the temperature of the outdoor heat exchanger 118 is adjusted by controlling the opening degree of the second expansion valve 120 on the downstream side of the outdoor heat exchanger 118. Therefore, when icing occurs in the outdoor heat exchanger 118, it is possible to cope with the occurrence of icing in the outdoor heat exchanger 118 without restricting the flow of the refrigerant to the outdoor heat exchanger 118.

In addition, since it is possible to cope with the occurrence of icing in the outdoor heat exchanger 118 without restricting the flow of the refrigerant to the outdoor heat exchanger 118, the unstable flow of the refrigerant in the refrigerant circulation line due to the restriction of the flow of the refrigerant to the outdoor heat exchanger 118 can be prevented when icing occurs in the outdoor heat exchanger 118.

In addition, since the instability of the flow of the refrigerant in the refrigerant circulation line 110 due to the restriction of the flow of the refrigerant to the outdoor heat exchanger 118 can be prevented, it is possible to prevent the fluctuation of the heat exchange rate in the high-pressure side indoor heat exchanger 114 due to the instability of the flow of the refrigerant in the refrigerant circulation line 110 and the resultant change in the temperature of the air discharged into the vehicle interior, thereby improving the heating performance in the vehicle interior.

In addition, since it is possible to cope with the occurrence of icing in the outdoor heat exchanger 118 without restricting the flow of the refrigerant to the outdoor heat exchanger 118 when icing occurs in the outdoor heat exchanger 118, the decrease in the refrigerant heat exchange efficiency (evaporation efficiency) on the outdoor heat exchanger 118 side due to the restriction of the refrigerant flow to the outdoor heat exchanger 118 can be prevented.

In addition, since it is possible to prevent the decrease in the refrigerant heat exchange efficiency (evaporation efficiency) on the outdoor heat exchanger 118 side due to the restriction of the refrigerant flow to the outdoor heat exchanger 118, it is possible to prevent a decrease in the heat generation amount in the high-pressure side indoor heat exchanger 114, thereby improving the heating performance in the vehicle interior.

Second Embodiment

Figure 6:
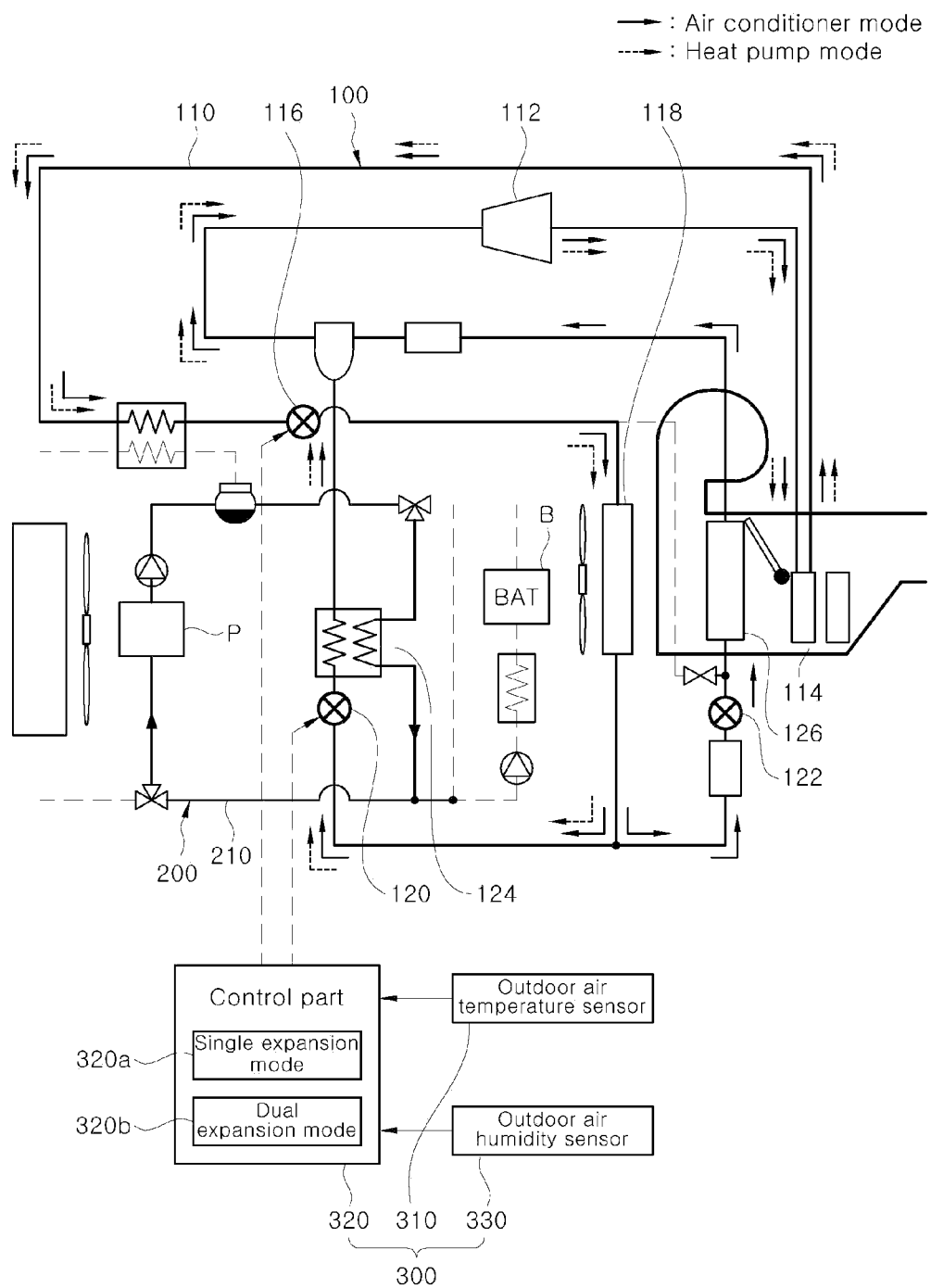
FIG. 6 is a view showing a vehicular heat management system according to a second embodiment of the present invention.

FIG. 6 is a diagram showing a vehicular heat management system according to a second embodiment of the present invention.

The vehicular heat management system according to the second embodiment has the same main configurations as those of the vehicular heat management system according to the first embodiment described above.

In particular, the vehicular heat management system according to the second embodiment has the same structure as the vehicular heat management system according to the first embodiment in that when icing occurs in the outdoor heat exchanger 118 under the heat pump mode condition, the temperature of the outdoor heat exchanger 118 is adjusted by controlling the opening degree of the second expansion valve 120 on the downstream side of the outdoor heat exchanger 118, whereby the occurrence of icing in the outdoor heat exchanger 118 can be prevented without restricting the flow of the refrigerant to the outdoor heat exchanger 118 when icing occurs in the outdoor heat exchanger 118.

However, the vehicular heat management system according to the second embodiment differs from the vehicular heat management system according to the first embodiment in terms of the structure of the icing occurrence determination part 300 for determining whether icing occurs in the outdoor heat exchanger 118.

In particular, the icing occurrence determination part 300 of the first embodiment is configured to determine whether icing occurs in the outdoor heat exchanger 118 based on the outdoor air temperature data. However, the icing occurrence determination part 300 of the second embodiment is configured to determine whether icing occurs in the outdoor heat exchanger 118 based on two types of data, i.e., the outdoor air temperature and the outdoor air humidity.

Explaining this in more detail, the icing occurrence determination part 300 of the second embodiment further includes an outdoor air humidity sensor 330.

The outdoor air humidity sensor 330 is installed outside the vehicle interior, and is configured to detect the relative humidity of the outdoor air (hereinafter abbreviated as "outdoor air humidity") and input the detected outdoor air humidity data to the control part 320.

Meanwhile, when the outdoor air temperature data and the outdoor air humidity data are respectively inputted from the outdoor air temperature sensor 310 and the outdoor air humidity sensor 330 in the heat pump mode, the control part 320 determines whether the outdoor air temperature and the outdoor air humidity satisfy all the conditions set in advance, respectively, and then determines whether icing occurs in the outdoor heat exchanger 118 depending on whether all of the conditions are satisfied.

That is, when the outdoor air temperature data and the outdoor air humidity data are respectively inputted from the outdoor air temperature sensor 310 and the outdoor air humidity sensor 330, respectively, the control part 320 determines whether the inputted outdoor air temperature satisfies a condition (hereinafter referred to as "first condition") in which the outdoor air temperature falls within a range exceeding a first set temperature and less than a second set temperature as in Formula 1 described above.

Then, the control part 320 determines whether the inputted outdoor air humidity satisfies a condition (hereinafter referred to as "second condition") in which the outdoor air humidity is equal to or greater than a preset reference humidity as shown in Formula 3 below.

Outdoor air humidity≥Reference humidity     Formula 3

As a result of the determination, if either of the first condition and the second condition is not satisfied, that is, if either of the first condition in which the outdoor air temperature falls within a range exceeding a first set temperature and less than a second set temperature and the second condition in which the outdoor air humidity is equal to or greater than a preset reference humidity is not satisfied, the control part 320 determines that no icing has occurred in the outdoor heat exchanger 118.

If all of the first condition and the second condition are satisfied, that is, if all of the first condition in which the outdoor air temperature falls within a range exceeding a first set temperature and less than a second set temperature and the second condition in which the outdoor air humidity is equal to or greater than a preset reference humidity are satisfied, the control part 320 determines that icing has occurred in the outdoor heat exchanger 118.

According to the determination results, as in the first embodiment, the control part 320 controls the first and second expansion valves 116 and 120 while entering the single expansion mode 320a or the dual expansion mode 320b.

In this regard, the reference humidity, which is a criterion for determining whether icing occurs in the outdoor heat exchanger 118, is preferably set to 75% relative humidity.

This is because icing occurs in the outdoor heat exchanger 118 when the outdoor air humidity is equal to or greater than the 75% relative humidity under the heat pump mode condition.

Next, an operation example of the vehicular heat management system according to the second embodiment having such a configuration will be described in detail with reference to FIGS. 6 and 7.

Figure 7:
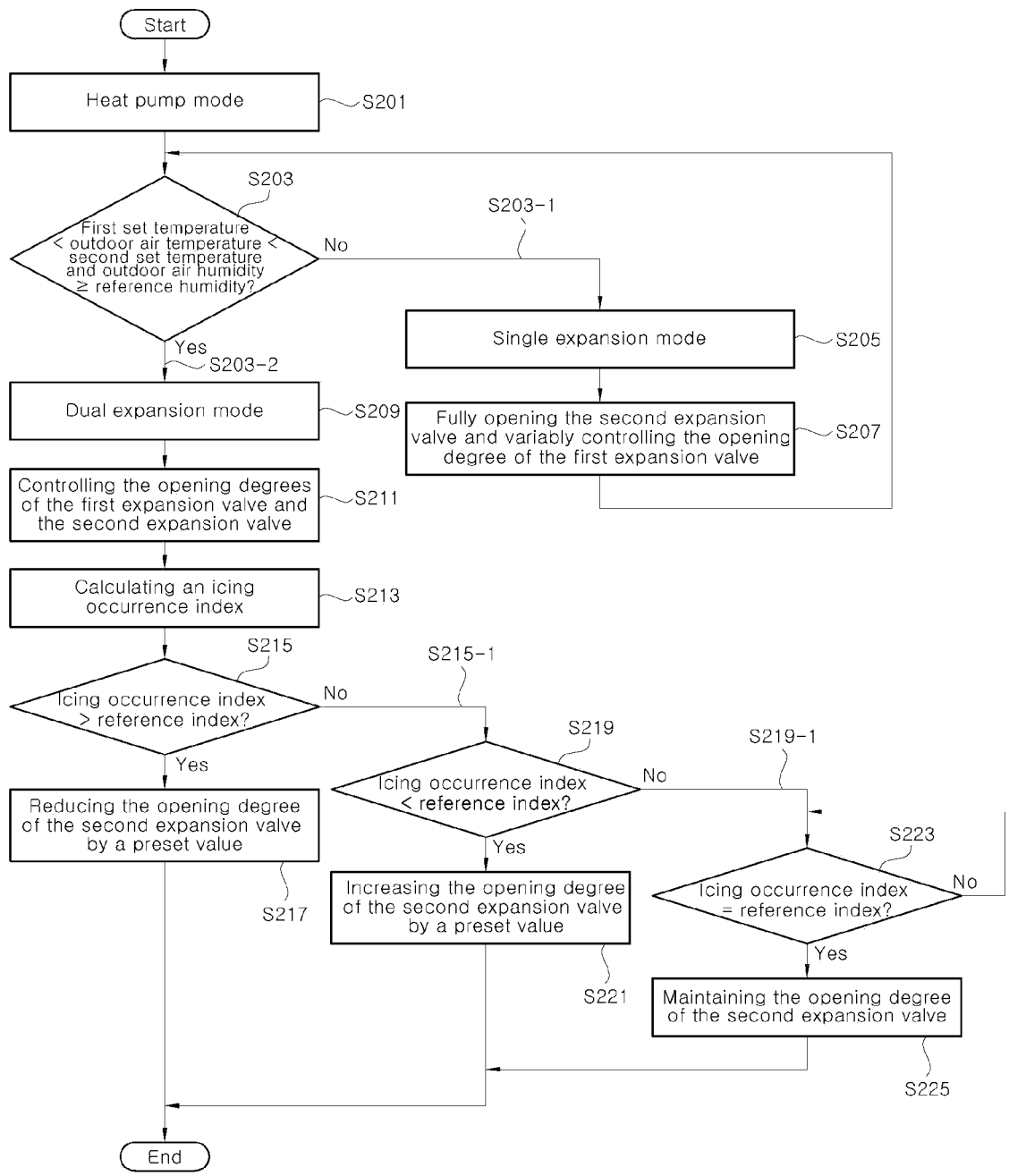
FIG. 7 is a flowchart showing an operation example of the vehicular heat management system according to the second embodiment of the present invention and showing an operation example depending on whether icing occurs in an outdoor heat exchanger under a heat pump mode condition.

Referring first to FIG. 7, in the heat pump mode (S201), the control part 320 determines whether all of a condition in which the outdoor air temperature falls within a range exceeding a first set temperature (−5 degrees C.) and less than a second set temperature (5 degrees C.) and a condition in which the outdoor air humidity is equal to or greater than a reference humidity (75%) are satisfied (S203).

As a result of the determination, if both the condition in which the outdoor air temperature falls within the range exceeding the first set temperature (−5 degrees C.) and less than the second set temperature (5 degrees C.) and the condition in which the outdoor air humidity is equal to or greater than the reference humidity (75%) are not satisfied (S203-1), the control part 320 determines that no icing has occurred in the outdoor heat exchanger 118, and enters the single expansion mode 320a according to this determination (S205).

An operation example after entering the single expansion mode 320a is the same as that of the first embodiment described above. Therefore, a description thereof will be omitted.

On the other hand, as a result of the determination in step S203, if both the condition in which the outdoor air temperature falls within the range exceeding the first set temperature (−5 degrees C.) and less than the second set temperature (5 degrees C.) and the condition in which the outdoor air humidity is equal to or greater than the reference humidity (75%) are satisfied (S203-2), the control part 320 determines that icing has occurred in the outdoor heat exchanger 118, and enters the dual expansion mode 320b according to this determination (S209).

An operation example after entering the dual expansion mode 320b is the same as that of the first embodiment described above. Therefore, a description thereof will be omitted.

According to the vehicular heat management system according to the second embodiment having such a configuration, the control part 320 is configured to determine whether icing occurs in the outdoor heat exchanger 118 based on the outdoor air temperature data and the outdoor air humidity data, This makes it possible to accurately determine whether icing occurs in the outdoor heat exchanger 118.

In addition, since it is possible to accurately determine whether icing occurs in the outdoor heat exchanger 118, the time point of entry into the dual expansion mode 320b due to the occurrence of icing in the outdoor heat exchanger 118 can be precisely controlled.

In particular, since it is possible to precisely control the time point of entry into the dual expansion mode 320b, the unstable refrigerant flow in the refrigerant circulation line 110 due to the entry into the dual expansion mode 320b can be minimized. This makes it possible to improve the performance of the pump mode.

While the preferred embodiments of the present invention have been described above, the present invention is not limited to the above-described embodiments. Various modifications and changes may be made without departing from the scope and spirit of the present invention defined in the claims.

What is claimed is:

1. A vehicular heat management system, comprising:
a compressor arranged on a heat pump type refrigerant circulation line;
a high-pressure side heat exchanger arranged on the heat pump type refrigerant circulation line;
an outdoor heat exchanger arranged on the heat pump type refrigerant circulation line;
a low-pressure side heat exchanger arranged on the heat pump type refrigerant circulation line;
a first expansion valve arranged on the upstream side of the outdoor heat exchanger;
a second expansion valve arranged on the downstream side of the outdoor heat exchanger; and
a control part configured to control opening degrees of the first expansion valve and the second expansion valve depending on whether icing occurs in the outdoor heat exchanger under a heat pump mode condition,
wherein the control part is configured to enter a dual expansion mode in which a refrigerant is expanded by the first expansion valve and the second expansion valve if the control part determines that icing occurs in the outdoor heat exchanger, and enter a single expansion mode in which a refrigerant is expanded by only one of the first expansion valve and the second expansion valve if the control part determines that icing does not occur in the outdoor heat exchanger,
wherein the control part is configured to, in the single expansion mode, fully open the second expansion valve on the downstream side of the outdoor heat exchanger and control the opening degree of the first expansion valve on the upstream side of the outdoor heat exchanger to adjust a refrigerant flow rate on the side of the outdoor heat exchanger, and
wherein the control part is configured to, in the dual expansion mode, control the opening degrees of the first expansion valve and the second expansion valve to adjust the refrigerant flow rate on the side of the outdoor heat exchanger in a decreasing direction so that the temperature of the outdoor heat exchanger is increased to cope with occurrence of icing.

2. The system of claim 1, wherein the control part is configured to determine that icing occurs in the outdoor heat exchanger when an outdoor air temperature falls within a range exceeding a first set temperature and less than a second set temperature higher than the first set temperature, and
the control part is configured to determine that icing does not occur in the outdoor heat exchanger when the outdoor air temperature does not fall within the range exceeding the first set temperature and less than the second set temperature.

3. The system of claim 1, wherein the control part is configured to determine that icing has occurred in the outdoor heat exchanger when both a first condition in which an outdoor air temperature falls within a range exceeding a first set temperature and less than a second set temperature and a second condition in which an outdoor air humidity is equal to or greater than a preset reference humidity are satisfied, and
the control part determines that no icing has occurred in the outdoor heat exchanger when either of the first condition and the second condition is not satisfied.

4. A vehicular heat management system, comprising:
a compressor arranged on a heat pump type refrigerant circulation line;
a high-pressure side heat exchanger arranged on the heat pump type refrigerant circulation line;
an outdoor heat exchanger arranged on the heat pump type refrigerant circulation line;
a low-pressure side heat exchanger arranged on the heat pump type refrigerant circulation line;
a first expansion valve arranged on the upstream side of the outdoor heat exchanger;
a second expansion valve arranged on the downstream side of the outdoor heat exchanger; and
a control part configured to control opening degrees of the first expansion valve and the second expansion valve depending on whether icing occurs in the outdoor heat exchanger under a heat pump mode condition,
wherein the control part is configured to enter a dual expansion mode in which a refrigerant is expanded by the first expansion valve and the second expansion valve if the control part determines that icing occurs in the outdoor heat exchanger, and enter a single expansion mode in which a refrigerant is expanded by only one of the first expansion valve and the second expansion valve if the control part determines that icing does not occur in the outdoor heat exchanger,
wherein the control part is configured to, in the dual expansion mode, keep the opening degree of one of the first expansion valve and the second expansion valve constant, and variably control the opening degree of the other of the first expansion valve and the second expansion valve, and
wherein the control part is configured to, in the dual expansion mode, keep the opening degree of one of the first expansion valve and the second expansion valve constant, and variably control the opening degree of the other of the first expansion valve and the second expansion valve.

5. The system of claim 4, wherein the control part is configured to, in the dual expansion mode, periodically predict the probability of occurrence of icing in the outdoor heat exchanger according to a pre-stored logic, and variably control the opening degree of the second expansion valve according to the predicted probability of occurrence of icing.

6. The system of claim 5, wherein the control part is configured to, in the dual expansion mode, periodically calculate an icing occurrence index of the outdoor heat exchanger at predetermined time intervals through pre-stored Formula: icing occurrence index (I)=outdoor air temperature (Tamb)−outdoor heat exchanger outlet refrigerant temperature (Tref),
the control part is configured to predict that the probability of occurrence of icing in the outdoor heat exchanger is high if the calculated icing occurrence index is greater than a pre-stored reference index, and
the control part is configured to predict that the probability of occurrence of icing in the outdoor heat exchanger is low if the calculated icing occurrence index is smaller than the reference index.

7. The system of claim 6, wherein the control part is configured to, when it is determined that the probability of occurrence of icing in the outdoor heat exchanger is high, reduce the opening degree of the second expansion valve by a preset value to reduce the refrigerant flow rate in the outdoor heat exchanger by a preset value.

8. The system of claim 7, wherein the control part is configured to, when it is determined that the probability of occurrence of icing in the outdoor heat exchanger is low, increase the opening degree of the second expansion valve by a preset value to increase the refrigerant flow rate in the outdoor heat exchanger by a preset value.

9. The system of claim 8, wherein the control part is configured to keep the opening degree of the second expansion valve at a current state when the icing occurrence index is equal to the reference index.

* * * * *